United States Patent
Takahashi

(10) Patent No.: US 8,830,570 B2
(45) Date of Patent: Sep. 9, 2014

(54) PRISM OPTICAL SYSTEM, AND IMAGE DISPLAY APPARATUS AND IMAGING APPARATUS INCORPORATING THE SAME

(71) Applicant: Olympus Corporation, Tokyo, CA (US)

(72) Inventor: Koichi Takahashi, Tokyo (JP)

(73) Assignee: Olympus Corporation, Tokyo (JP)

(*) Notice: Subject to any disclaimer, the term of this patent is extended or adjusted under 35 U.S.C. 154(b) by 0 days.

(21) Appl. No.: 13/785,546

(22) Filed: Mar. 5, 2013

(65) Prior Publication Data
US 2013/0182317 A1 Jul. 18, 2013

Related U.S. Application Data

(63) Continuation of application No. PCT/JP2011/001881, filed on Mar. 29, 2011.

(30) Foreign Application Priority Data

Sep. 6, 2010 (JP) .................................. 2010-198660

(51) Int. Cl.
*G02B 27/01* (2006.01)
*G02B 5/04* (2006.01)
*G02B 17/00* (2006.01)

(52) U.S. Cl.
CPC .............. *G02B 27/0101* (2013.01); *G02B 5/04* (2013.01); *G02B 2027/0178* (2013.01); *G02B 27/0172* (2013.01); *G02B 17/004* (2013.01); *G02B 2027/011* (2013.01)
USPC ............ 359/365; 359/630; 359/631; 359/640

(58) Field of Classification Search
CPC .... G02B 5/04; G02B 17/004; G02B 27/0172; G02B 27/0101
USPC .................. 359/629–633, 636, 639, 640, 365
See application file for complete search history.

(56) References Cited

U.S. PATENT DOCUMENTS

| | | | |
|---|---|---|---|
| 5,790,311 A | 8/1998 | Togino | |
| RE37,169 E | 5/2001 | Togino | |
| 6,710,902 B2 | 3/2004 | Takeyama | |
| 2002/0018307 A1* | 2/2002 | Nagaoka | 359/833 |
| 2003/0002167 A1* | 1/2003 | Hoshi et al. | 359/633 |
| 2003/0063400 A1* | 4/2003 | Sunaga et al. | 359/861 |
| 2003/0086135 A1 | 5/2003 | Takeyama | |

FOREIGN PATENT DOCUMENTS

| | | |
|---|---|---|
| JP | 09-197337 A | 7/1997 |
| JP | 2000-105338 A | 4/2000 |

(Continued)

OTHER PUBLICATIONS

International Search Report dated Jun. 21, 2011 issued in PCT/JP2011/001881.

*Primary Examiner* — Frank Font
(74) *Attorney, Agent, or Firm* — Scully, Scott, Murphy & Presser, P.C.

(57) ABSTRACT

The invention provides a prism optical system includes a prism in which a space formed by at least two optical surfaces mutually decentered with respect to an axial chief ray of an incident light beam is filled up with a medium having a refractive index of greater than 1. At least two optical surfaces are rotationally asymmetric surfaces, five internal reflections take place inside the prism, and there is an intermediate image formed inside the prism, which image is in turn formed outside the prism.

11 Claims, 17 Drawing Sheets

(56) References Cited

FOREIGN PATENT DOCUMENTS

| | | | |
|---|---|---|---|
| JP | 2002-311379 A | 10/2002 |
| JP | 2004-325985 A | 11/2004 |
| JP | 2006-003879 A | 1/2006 |
| JP | 2007-094175 A | 4/2007 |
| JP | 2008-076429 A | 4/2008 |

\* cited by examiner

PRISM OPTICAL SYSTEM, AND IMAGE DISPLAY APPARATUS AND IMAGING APPARATUS INCORPORATING THE SAME

BACKGROUND OF THE INVENTION

The present invention relates to a prism optical system using a rotationally asymmetric surface, and an image display apparatus and imaging apparatus incorporating the same.

So far, it has been known to use a prism having a plurality of optical surfaces as a typical decentered optical system. When such a prism is used as an optical system adapted to observe an image display device, light exiting out from the display device enters the prism. Then, the light is reflected inside the prism, and exits out from the prism, arriving at the viewer s eyeball so that images may be viewed as enlarged virtual images.

For such an image-viewing optical system, JP(A) 2008-76429 discloses a prism that forms a primary image by at least three reflecting surfaces for projection onto the eyeball. JP(A) s 2007-94175 and 2004-325985 disclose eyeglasses with a hologram device mounted on their lens segment. Another optical system for image display apparatus has been proposed in JP(A) 2006-3879 disclosing that light is projected onto the eyeball by a light guide and an eyepiece lens.

SUMMARY OF THE INVENTION

According to one aspect of the invention, there is a prism optical system provided, which includes a prism in which a space formed by at least two optical surfaces mutually decentered with respect to an axial chief ray of an incident light beam is filled up with a medium having a refractive index of greater than 1, wherein at least two surfaces out of said optical surfaces are rotationally asymmetric surfaces, five internal reflections take place inside said prism, and there is an intermediate image formed inside said prism, which image is in turn formed outside said prism.

In one aspect of the invention, one surface out of a surface on which light is incident and a surface from which light exits out is capable of at least one transmission and at least two internal reflections.

In one aspect of the invention, at least one internal reflection off at least one surface of said entrance or exit surface is total reflection.

In one aspect of the invention, a surface in opposition to said entrance or exit surface is defined by a single surface.

One aspect of the invention is designed such that light exiting out from an image display surface for displaying an image enters said prism optical system, and thereafter exits out from said prism optical system, forming an exit pupil to be projected onto the eyeball of a viewer, and such that in order along an optical path taken by light from incidence of light on said prism optical system until light exits out from said prism optical system, said light enters a first surface that is an entrance or transmitting surface, and is reflected at a second surface that is an internal reflection surface in opposition to said first surface, then again reflected at said first surface that is an internal reflection surface, then again reflected at said second surface that is an internal reflection surface, then again reflected at said first surface that is an internal reflection surface, and then again reflected at said second surface that is an internal reflection surface, exiting out from said prism optical system through said first surface.

In one aspect of the invention, an angle $\alpha$ that an axial chief ray incident on said prism optical system forms with an axial chief ray exiting out from said prism optical system satisfies a condition: $0° \leq \alpha \leq 60°$.

In one aspect of the invention, the entrance surface and the exit surface are the same surface.

In one aspect of the invention, the entrance surface is different from the exit surface.

In one aspect of the invention, a surface in opposition to the surface on which light is incident or the surface from which light exits out is partially cut away.

In one aspect of the invention, there is an image display apparatus provided including said prism optical system, wherein when said image display device is located in opposition to said first surface of said prism optical system and the eyeball of the viewer is located in opposition to a transmitting area of said first surface, an enlarged virtual image is presented to said viewer.

In one aspect of the invention, an exit pupil of said prism optical system is formed near an exit window of the first surface or between the first surface and the eyeball of the viewer.

In one aspect of the invention, there is an imaging apparatus provided including said prism optical system, wherein an imaging device is positioned in opposition to said first surface, and an aperture stop is positioned in front of and near a transmitting area of said first surface to take images in the outside world.

Still other objects and advantages of the invention will in part be obvious and will in part be apparent form the specification.

The invention accordingly comprises the features of construction, combinations of elements, and arrangement of parts which will be exemplified in the construction hereinafter set forth, and the scope of the invention will be indicated in the claims.

DESCRIPTION OF EXEMPLARY EMBODIMENTS

In an optical system of the invention, shown generally by 1, a space formed by at least two optical surfaces mutually decentered with respect to an axial chief ray of an incident light beam is filled up with a medium having a refractive index of greater than 1. It is then preferable that the at least two optical surfaces are rotationally asymmetric surfaces, and are capable of five internal reflections inside the prism and forming an intermediate image inside the prism, which image is in turn formed outside the prism optical system 1.

Figure 1:
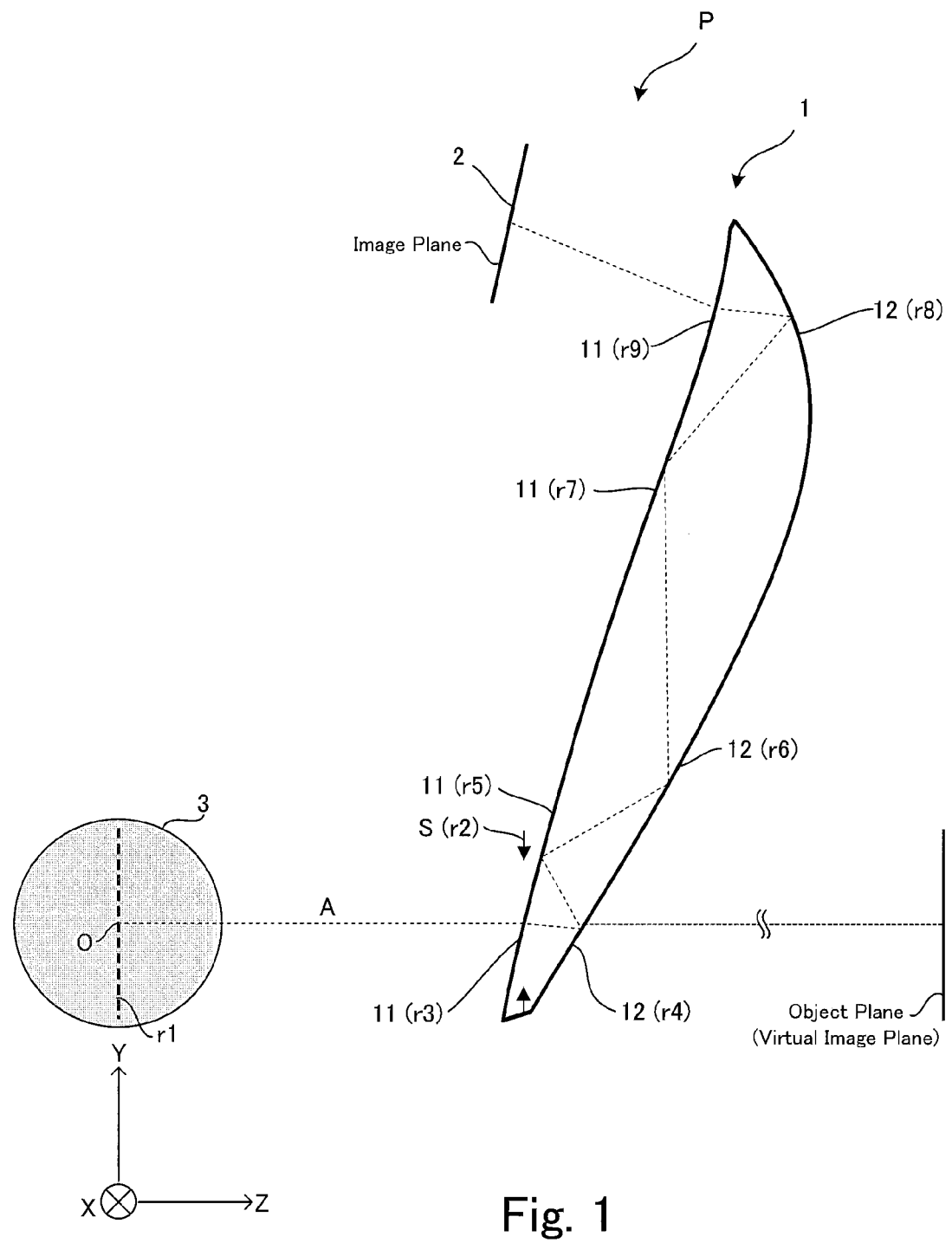
FIG. 1 is illustrative in construction of the prism optical system according to Example 1.

Given the prism optical system 1 in which the space formed by at least two optical surfaces mutually decentered with respect to an axial chief ray of an incident light beam is filled up with a medium having a refractive index of greater than 1, it can be configured in such a smooth, streamlined shape as shown in FIG. 1. For instance when it is used as a face-mounted image display apparatus P, it will be capable of giving those who put on it a near-future smart impression. When it is used as an imaging apparatus, it will be able to be made quite different in shape from an ordinary camera so that, in security or like applications, images of persons of interest can be taken without being noticed.

Given the prism optical system 1 in which the space formed by at least two optical surfaces mutually decentered with respect to an axial chief ray of an incident light beam is filled up with a medium having a refractive index of greater than 1, light transmits through the medium of the prism so that if the angle of incidence is set greater than the critical angle, total reflection can then take place inside the prism.

If the optical system having at least two surfaces is constructed of a single prism, it is then possible to fabricate an optical device of stabilized quality because the respective optical surfaces are combined in shape into a mold for the fabrication of that optical device.

In the prism optical system of the invention, the incident light beam enters the prism through the decentered one surface of the prism, and passes through the medium in the space formed by the mutually decentered two optical surfaces, during which the light beam is reflected off the at least two surfaces five times. Therefore, if each transmitting surface and each reflecting surface are powered surfaces rather than planes, there are decentration aberrations occurring at the respective surfaces; however, they can be well corrected because the at least two mutually decentered surfaces are defined by rotationally asymmetric surfaces.

Five internal reflections occurring inside the prism enable the length of an optical path through the prism to be curtailed. Even when the prism is short, for instance, the optical path involved can be made longer. When it comes to the image display apparatus P of the type attached to eyeglasses for viewing with the exit surface of the prism located in front of the eyeball of a viewer and the entrance surface of the prism located in front of an image display device 2 near the temple site of eyeglasses, the prism length will be limited by the distance between them.

The whole focal length f of the optical system will be determined by the display device size and the angle of view upon viewing, and the prism length will be determined by that f to a certain degree. Making sure the necessary optical path length will thus be able to be controlled by changing the spacing between at least two surfaces forming a part of the prism.

By such arrangement as described above, the intermediate image is formed inside the prism, and that intermediate image is in turn formed outside the prism optical system 1 thereby gaining some flexible control of the specifications of the optical systems.

When imaging is implemented without forming any intermediate image in the case of the image display apparatus P as an example, relations between the angle of view w of the optical system, the horizontal length H of the display device and the focal length f of the optical system will uniquely be determined as $$H/2 = \tan(\omega/2) \times f$$

In actual applications, the length and shape of the prism are determined according to the size of the display device, resulting in a limited degree of freedom for the magnitude of the angle of view on viewing. If the intermediate image is first formed inside the prism and then formed outside the prism, however, it is then possible to determine the whole specifications of the optical system more at one s disposal.

Referring typically to the image display apparatus P, the angle of view upon viewing can be controlled by changing the size of the intermediate image inside the prism. For the reason that the intermediate image on the image display device 2 that is an object is a secondary object, increasing the intermediate image is equivalent to an increasing H. From the aforesaid condition, it is thus found that the angle of view 2ω can easily be changed.

In this conjunction, the then focal length is taken as a combination of two optical systems: focal length f1 of a system portion up to the formation of the primary image and focal length f2 of a system portion upon substantially infinite projection of the primary image, and the focal length fz of the whole optical system is given by fz=f1×f2/Δ where Δ is the distance between the two optical systems. Note here that it is not possible to identify Δ because the instant optical system is separated into two system portions, rendering it difficult to identify the respective principal points.

Here suppose that the aforesaid intermediate image be a secondary object (having an object height H). The optical system is nothing less than projecting the secondary object onto the eyeball of the viewer; in another parlance, the aforesaid condition becomes H/2=tan(ω/2)×f1 where ω is the angle of view in this case), which may be modified to ω=2·arctan(H/(2·f1)). For instance, as H increases and f2 decreases, ω grows so large that there can be a wide angle of view achievable.

For the prism optical system 1 according to the invention, it is preferable that one of the surface on which light is incident or the surface from which light exits out is capable of at least one transmission and at least two internal reflections.

The surface on which light is incident or from which light exits out is here understood to refer to a surface that, when used for a display apparatus, acts as an exit surface having transmission and when used for an imaging apparatus, acts as an entrance surface having transmission. By making that surface capable of internal reflection at the same time, its transmitting area can overlap its reflecting area inside the prism, and further by allowing for two internal reflections, two reflections can take place at the single surface so that two reflecting areas can overlap each other while the surface-to-surface seam is left unnoticed. In other words, the prism itself can be made more compact, working in favor of reducing the size and weight of the apparatus.

Enabling the prism optical system 1 to have compact construction, such arrangement will clear the wearer of the image display apparatus P of discomforts and inconveniences, or will contribute to reductions in the whole size and weight of the imaging apparatus.

Preferably in the prism optical system 1 according to the invention, one of the aforesaid entrance and exit surfaces should have at least one internal reflection or total reflection.

By allowing the internal reflection of the first surface to occur in the form of total reflection, the first surface is capable of internal reflection without having a reflection coating on it. When the first surface is used as the entrance or exit surface, there is no need for counting on special means such as half-mirror coating or HOE because the area capable of total reflection is transparent to light. In addition, that total reflection makes sure virtually almost 100% reflectivity higher than that of a metal coat, holding back reductions in the whole efficiency.

Such arrangement would enable the prism to be fabricated at lower costs because of no need for special coating or the like. In addition, the high reflectivity would make sure the apparatus has high efficiency and is able to be energy efficient as well.

Preferably in the prism optical system 1 according to the invention, the surface located in opposition to the surface on which light is incident or from which light exits out should be constructed of one single surface.

With such arrangement, one surface of the prism could be constructed of an apparently smooth surface. This surface will be located outside the image display apparatus P so as to configure it in apparently less discomfort shape.

In the prism optical system 1 of the invention, light exiting out from the image display surface 2 for displaying images enters the prism optical system 1, and thereafter exits out from the prism optical system 1, forming an exit pupil that is to be projected onto the viewer s eyeball. In order along a path taken by light from the incidence of light on the prism optical system 1 until the exit of light from the prism optical system 1, it is preferable that after transmitting through the first surface that is an entrance or transmitting surface, light is reflected at the second surface that is an internal reflection surface in opposition to the first surface, again reflected at the first surface that is an internal reflection surface, again reflected at the second surface that is an internal reflection surface, again reflected at the first surface that is an internal reflection surface, and again reflected at the second surface that is an internal reflection surface, exiting out from the prism optical system 1 through the first surface.

With the prism optical system 1 constructed of such optical surfaces as mentioned above, the prism is capable of multi-reflections within the first surface and the second surface as depicted in FIG. 1, so that the optical system, albeit being a very small device, can practically have an ever longer optical path. The prism has also a substantially rod-like shape having curved surfaces, so that it can be configured in conformity to the contour shape of the eyeglasses to be described later. In addition, the prism optical system 1 may also be used as part of eyeglasses frames.

Thus, the optical device is very small and configured into a substantially rod-like shape so that when it is located in front of the eyeball of the viewer, there can be a decrease in an area that stands in the way to the viewer s field of view to the outside.

Further, the prism is capable of two internal reflections at the first surface, before or after which it is capable of three internal reflections at the second surface, so that if the tilt of the second surface is set at a proper angle, the viewer s eyeball can then be set at any desired position and angle. With the prism optical system 1 as set up above, it is thus possible to locate the image display device 2 comparatively freely at such a relative position and angle as being not obstructive to the viewer.

Such arrangement enables the user to implement see-through viewing with no blind spot in the viewer s field of view to the outside, so that the user can put on the prism optical system more comfortably. In addition, the high degree of flexibility in shape enables the inventive prism optical system to be used as part of eyeglasses frames, and those who put on the image display apparatus P look objectively quite natural.

For the prism optical system 1 of the invention, it is preferable to satisfy the condition: $0°≤\alpha≤60°$ where $\alpha$ is the angle that the axial chief ray incident on the prism optical system 1 forms with the axial chief ray exiting out from the prism optical system 1.

It is desired that the angle that the axial chief ray exiting out from the center of the image display device 2 forms with the axial chief ray exiting out from the center of the prism and arriving at the center of the viewer s pupil be set within the aforesaid range. For the viewer that views the image display apparatus P with one eye, it is preferable that the position of the display screen lies outside the front, because it does not stand in the way to the front field of view to the outside world so that while high visibility to the outside world is kept, electronic images can be viewed with the eyeball outside.

With the image display device 2 attached to the temple section of the eyeglasses, the image display apparatus is located with the display surface directed substantially in front. With the viewer putting on the eyeglasses, however, the temple section is held open a bit outwardly so that the axial chief rays from the display device are incident on the prism with a certain angle too. With this fact in mind, it is desirous that the angle that the axial chief ray of incident light forms with the axial chief ray of emergent light is set within the aforesaid range.

For the inventive prism optical system 1, it is preferable that the entrance and exit surfaces are formed of the same surface.

As the entrance and exit surfaces of the prism optical system 1 are formed of the same surface, it enables the prism to have a combined entrance and exit surface within the same plane so that the image display apparatus P can be located with the image display device 2 lying in the same direction as the viewer s eyeball. It is thus possible to attach the image display device 2 to the temple section of the eyeglasses in the front direction of the viewer thereby projecting images on the image display device 2 onto the viewer s eyeball.

In the inventive prism optical system 1, the entrance surface may be different from the exit surface.

As the entrance surface of the prism optical system 1 is different from the exit surface, it enables the directions of the entrance and exit surfaces to be freely varied. This in turn enables the angle of the exit surface facing directly the image plane to be so freely set that the angle of incidence of chief rays on the image plane can be set. For instance when it comes to the image display apparatus P, it is easy to set the angle of incidence of chief rays in conformity to the angle-of-field feature of the image display device 2. In addition, such arrangement makes sure control of telecentricity so that the decreases in light quantity are reduced as far as the periphery of the viewing screen, making the screen have uniform brightness.

The inventive prism optical system 1 is characterized in that the surface in opposition to the surface on which light is incident or from which light exits out is partly cut away. More preferably, the portion to be cut away is near the intermediate image.

As the optical surface is partly cut away, it enables the prism optical system 1 to decrease in weight. Further, as the portion to be cut away is near the intermediate image, it helps limit ghosts and flares, making it possible to view or take clearer images.

In the image display apparatus P of the invention, the image display device 2 is located in opposition to the first surface of the prism display optical system 1, so that when the viewer s eyeball is located in opposition to the transmitting area of the first surface, enlarged virtual images can be presented to the viewer.

Light emanating off from the image display device 2 enters the prism optical system through the prism s entrance surface, and is internally reflected off at least two surfaces five times, and then exits out from the first surface in the form of substantially parallel light, entering the pupil of the viewer s eyeball. With the image display apparatus P of such arrangement, it is possible for the viewer to view enlarged virtual images.

For the image display apparatus P, it is preferable that the exit pupil of the prism optical system 1 is formed near the exit window of the first surface or between the first surface and the viewer s eyeball.

As the exit pupil of the display device is located near the exit window of the first surface of the prism optical system or interposed between the first surface and the viewer s eyeball, it helps reduce shadings of light beams on the periphery of an image under observation.

With the image display apparatus P having such construction, it is possible for the viewer to view clear images as far as the periphery of the screen.

In the imaging apparatus of the invention, an imaging device is located in opposition to the first surface of the prism optical system 1, and an aperture stop is located in front of and near the transmitting area of the first surface thereby taking images in the outside world.

As the aperture stop having a circular aperture is located below and near the first surface of the prism and the imaging device such as a CCD is located in opposition to the first surface, it allows light incident from the first surface of the prism through the aperture stop to be internally reflected at the first and second surfaces five times, arriving at the imaging device through the first surface for light collection. It is thus possible to achieve an imaging apparatus that is reduced in terms of size and weight.

The prism optical system 1 here is now explained with reference to specific examples.

Specific constituting parameters of the prism optical system 1, given later, have been determined on the basis of the results of back ray tracing wherein, as shown in FIG. 1, a center ray A passing through a phantom surface r1 set near a viewing position of the viewer where the eyeball 3 is located goes through the prism optical system 1 toward the image display device 2.

As depicted in FIG. 1, the center ray A exiting out from the prism optical system 1 forms a virtual image plane (referred to as an object plane in back ray tracing) on the right side of the prism optical system 1 upon viewing in the viewing position in back ray tracing. Here the phantom surface r1 is supposed to be set at a position 1 m away from the virtual image plane toward the exit side, with the point of intersection of the phantom surface r1 with the center ray A as the origin O. Then, a direction of the center chief ray from the origin O toward the prism optical system 1 side is defined as the Z-axis positive direction; the direction orthogonal to the Z-axis on the image display device 2 side from the origin O is defined as the Y-axis positive direction; and the sheet plane of FIG. 1 is defined as the Y-Z plane. Then, an axis that forms a right-handed orthogonal coordinate system with the Y- and Z-axes is defined as the X-axis positive direction.

Given to each decentered surface are the amount of decentration of the coordinate system—on which that surface is defined—from the center of the origin O of the optical system 1 (X, Y and Z in the X-, Y- and Z-axis directions) and the angles ($\alpha$, $\beta$, $\gamma$ (°)) of tilt of the coordinate system for defining each surface about the X-, Y- and Z-axes of the coordinate system defined on the origin of the optical system.

It is here to be noted that the positive $\alpha$ and $\beta$ mean counterclockwise rotation with respect to the positive directions of the respective axes, and the positive $\gamma$ means clockwise rotation with respect to the positive direction of the Z-axis. Referring to the $\alpha$, $\beta$, $\gamma$ rotation of the center axis of a certain surface, the coordinate system for defining each surface is first a rotated counterclockwise about the X-axis of the coordinate system defined on the origin of the coordinate system. Then, it is $\beta$ rotated counterclockwise about the Y-axis of the thus rotated, new coordinate system, and finally $\gamma$ rotated clockwise about the Z-axis of the thus rotated, new another coordinate system.

When a specific surface of the optical function surfaces forming the optical system of each example and the subsequent surface form together a coaxial optical system, there is a surface separation given. Besides, the radii of curvature of the surfaces, and the refractive indices and Abbe constants of the media are given as usual.

It is also noted that coefficient terms to which data are not given in the following constituting parameters are zero. The refractive indices and Abbe constants on a d-line basis (587.56 nm wavelength) are given, and length is given in mm. The decentration of each surface is represented by the quantity of decentration from a reference surface, as mentioned above.

The surface shape of the free-form surface used in the embodiments of the invention is defined by the following formula (a). Suppose here that the Z-axis of that defining formula is the axis of the free-form surface.

$$Z = (r^2/R)/[1 + \sqrt{\{1 - (1+k)(r/R)^2\}}] + \sum_{j=1}^{\infty} C_j X^m Y^n \quad (a)$$

Here the first terms of Formula (a) is the spherical term, and the second term is the free-form surface term.

In the spherical term,

R is the radius of curvature of the vertex, k is the conic constant, and r is $\sqrt{(X^2+Y^2)}$.

The free-form surface term is:

$$\sum_{j=1}^{66} C_j X^m Y^n = C_1 + C_2 X + C_3 Y + C_4 X^2 + C_5 XY + C_6 Y^2 + C_7 X^3 +$$

-continued $$C_8 X^2 Y + C_9 XY^2 + C_{10} Y^3 + C_{11} X^4 + C_{12} X^3 Y + C_{13} X^2 Y^2 +$$
$$C_{14} XY^3 + C_{15} Y^4 + C_{16} X^5 + C_{17} X^4 Y + C_{18} X^3 Y^2 + C_{19} X^2 Y^3 +$$
$$C_{20} XY^4 + C_{21} Y^5 + C_{22} X^6 + C_{23} X^5 Y + C_{24} X^4 Y^2 + C_{25} X^3 Y^3 +$$
$$C_{26} X^2 Y^4 + C_{27} XY^5 + C_{28} Y^6 + C_{29} X^7 + C_{30} X^6 Y + C_{31} X^5 Y^2 +$$
$$C_{32} X^4 Y^3 + C_{33} X^3 Y^4 + C_{34} X^2 Y^5 + C_{35} XY^6 + C_{36} Y^7 \dots$$

where Cj (j is an integer of 1 or greater) is a coefficient.

In general, that free-form surface has no plane of symmetry in both the X-Z plane and the Y-Z plane. However, by bringing all the odd-numbered degree terms with respect to X down to zero, the free-form surface can have only one plane of symmetry parallel with the Y-Z plane. For instance, this may be achieved by bringing down to zero the coefficients for the terms $C_2$, $C_5$, $C_7$, $C_9$, $C_{12}$, $C_{14}$, $C_{16}$, $C_{18}$, $C_{20}$, $C_{23}$, $C_{25}$, $C_{27}$, $C_{29}$, $C_{31}$, $C_{33}$, $C_{35}$, ... in the above defining formula (a).

By bringing all the odd-numbered terms with respect to Y down to zero, the free-form surface can have only one plane of symmetry parallel with the X-Z plane. For instance, this may be achieved by bringing down to zero the coefficients for the terms $C_3$, $C_5$, $C_8$, $C_{10}$, $C_{12}$, $C_{14}$, $C_{17}$, $C_{19}$, $C_{21}$, $C_{23}$, $C_{25}$, $C_{27}$, $C_{30}$, $C_{32}$, $C_{34}$, $C_{36}$, ... in the above defining formula.

If any one of the directions of the aforesaid plane of symmetry is used as the plane of symmetry and decentration is implemented in a direction corresponding to that, for instance, the direction of decentraton of the optical system with respect to the plane of symmetry parallel with the Y-Z plane is set in the Y-axis direction and the direction of decentration of the optical system with respect to the plane of symmetry parallel with the X-Z plane is set in the X-axis direction, it is then possible to improve productivity while, at the same time, making effective correction of rotationally asymmetric aberrations occurring from decentration.

The aforesaid defining formula (a) is given for the sake of illustration alone as mentioned above: the feature of the invention is that by use of the rotationally asymmetric surface having only one plane of symmetry, it is possible to correct rotationally asymmetric aberrations occurring from decentration while, at the same time, improving productivity. It goes without saying that the same advantages are achievable even with any other defining formulae.

FIG. 1 is illustrative in conception of the image display apparatus P incorporating the prism optical system 1 according to the inventive embodiment.

As depicted in FIG. 1, the prism optical system 1 of Example 1 comprises a prism in which the space formed by at least two optical surfaces mutually decentered with respect to an axial chief ray of an incident light beam is filled up with a medium having a refractive index of greater than 1. The at least two optical surfaces are rotationally asymmetric surfaces, five internal reflections occur inside the prism, and there is an intermediate image formed inside the prism, which image is in turn formed outside the prism.

In the image display apparatus P, the image display device 2 is located in opposition to the first surface 11 of the prism optical system 1 that is the entrance surface on which light is incident, and the viewer s eyeball 3 is located in opposition to the first surface 11 that functions as the transmitting area of the surface from which light exits out, so that enlarged virtual images can be presented to the viewer.

Then, Example 1 according to the inventive prism optical system 1 will be explained.

Figure 2:
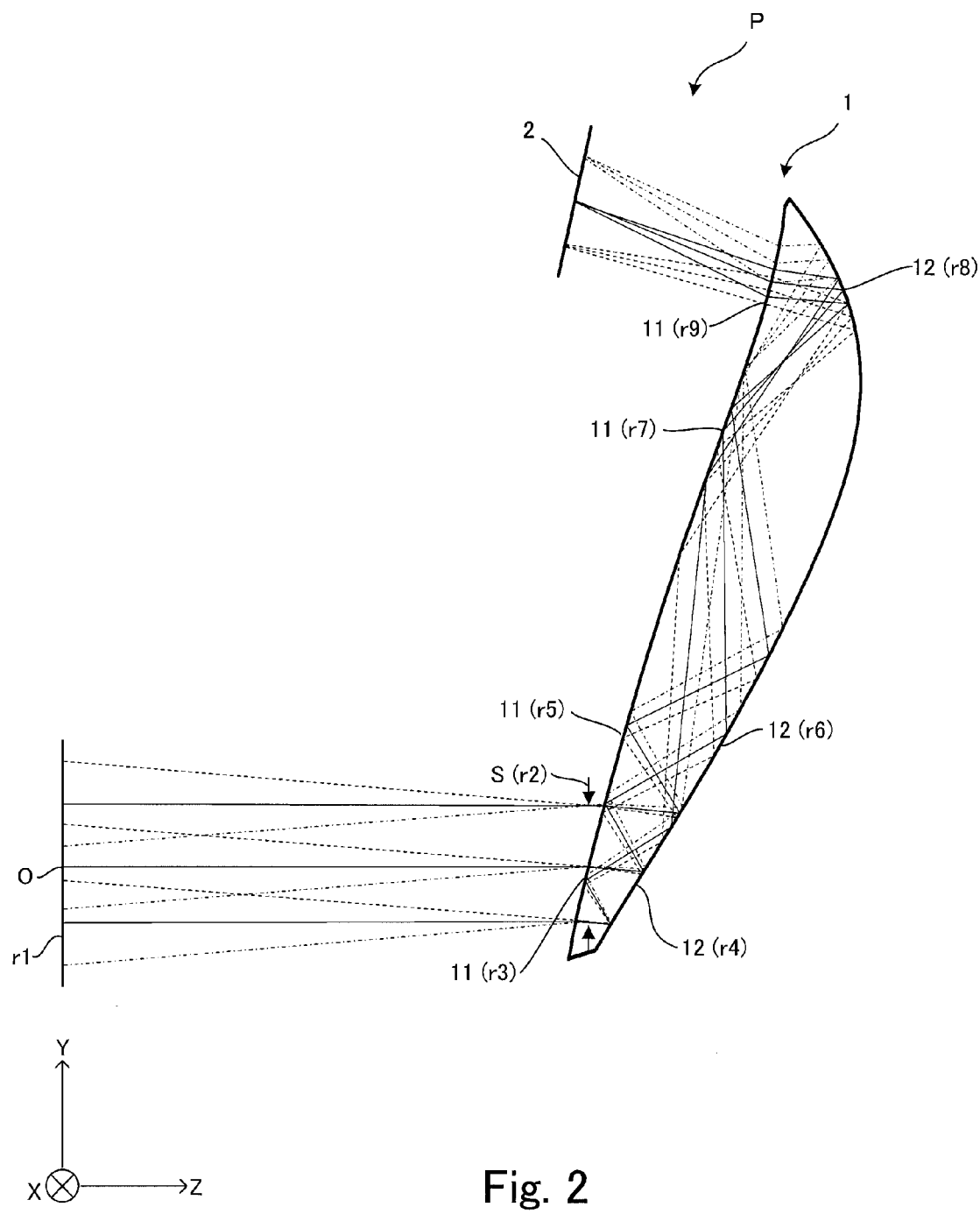
FIG. 2 is an optical path diagram in the Y-Z section for the prism optical system according to Example 1.
Figure 3:
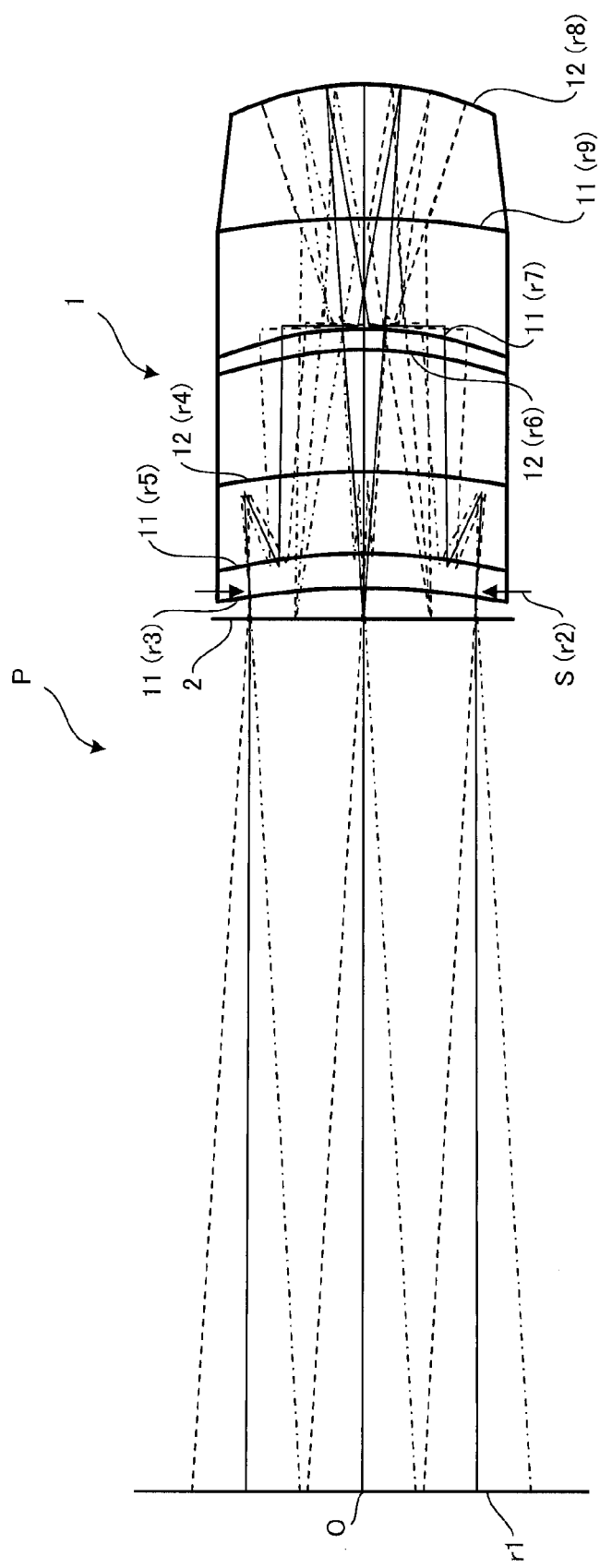
FIG. 3 is an optical path diagram in the X-Z section for the prism optical system according to Example 1.
Figure 4:
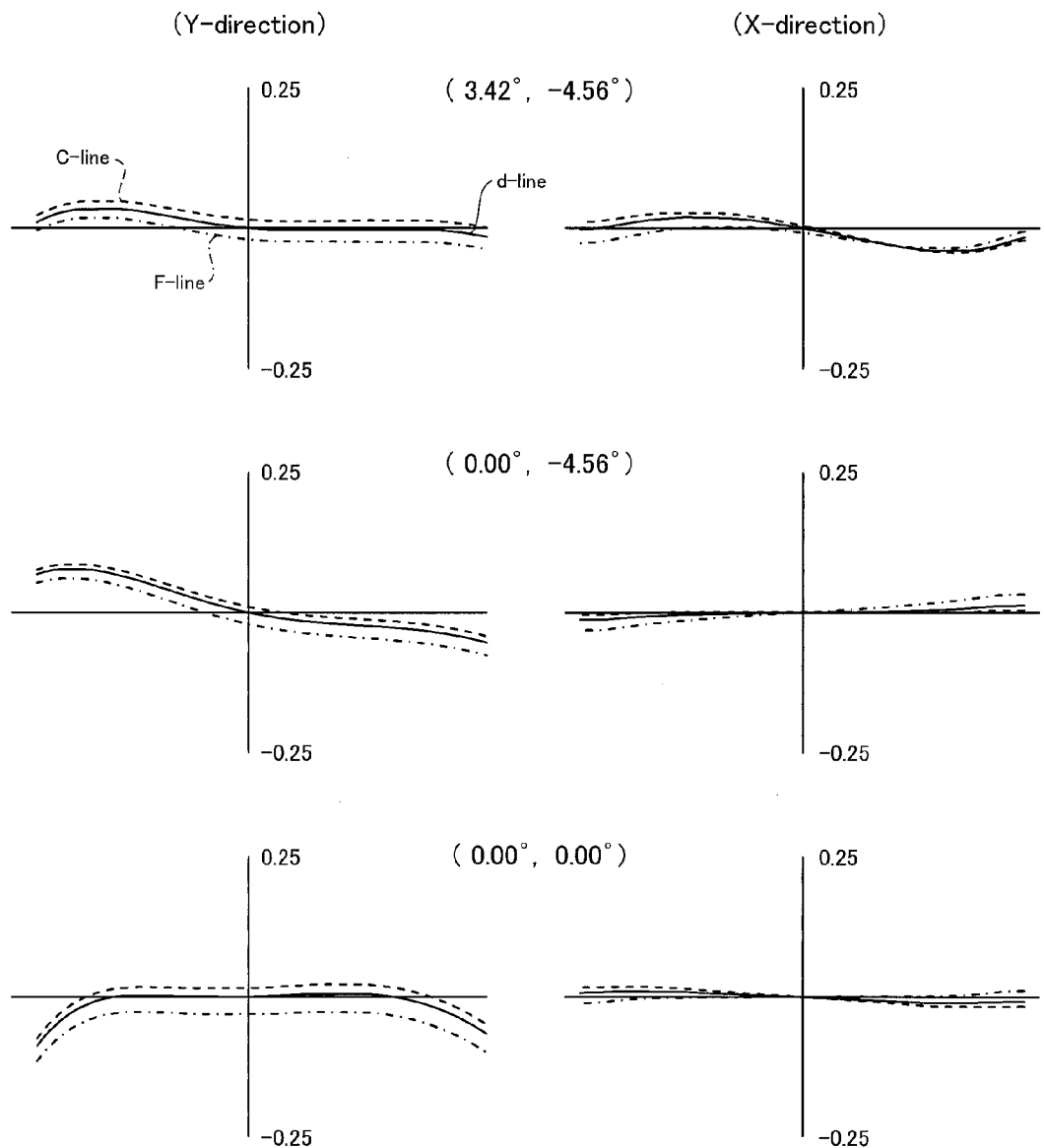
FIG. 4 is a set of transverse aberration diagrams for the whole optical system according to Example 1.
Figure 5:
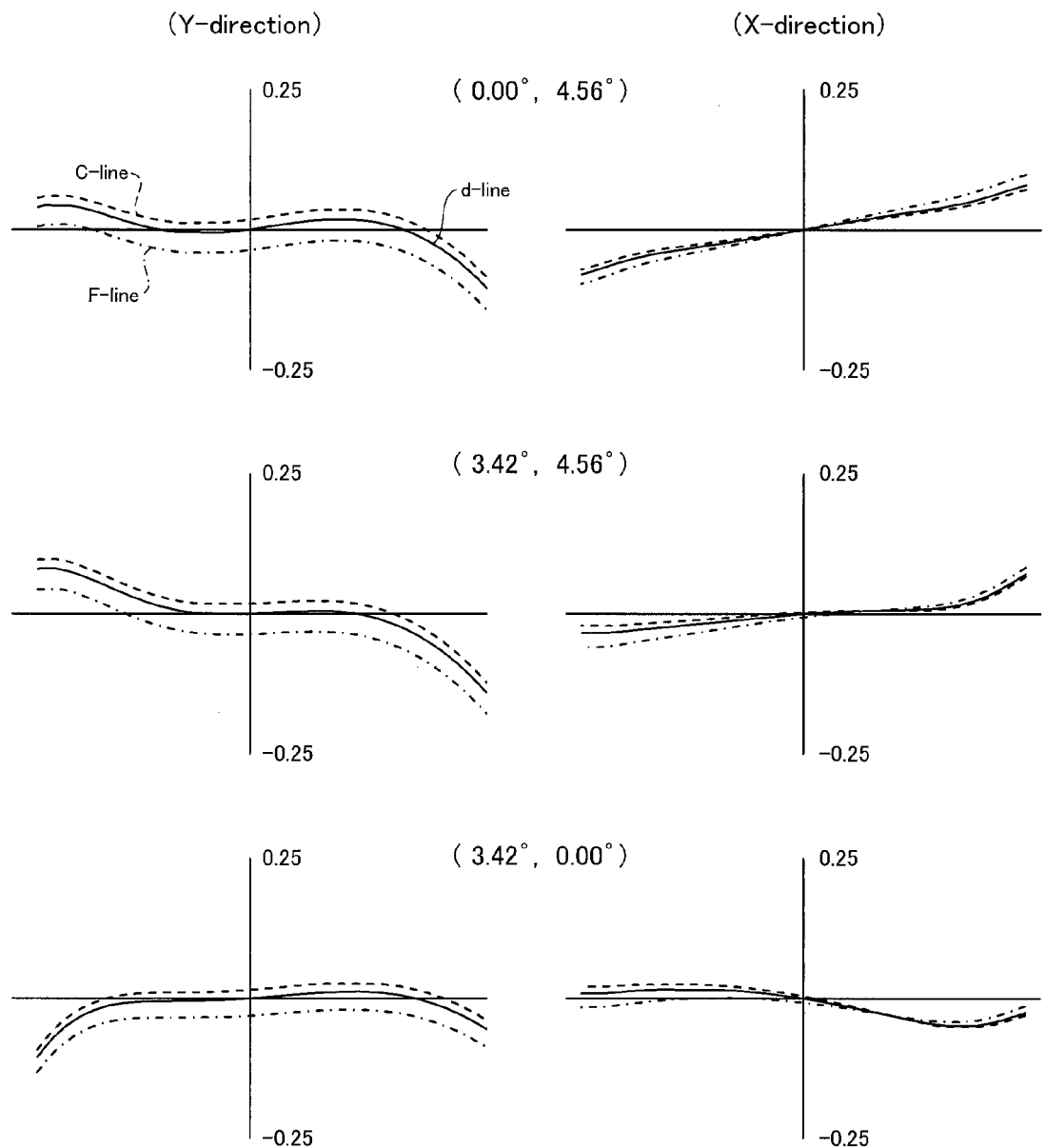
FIG. 5 is a set of transverse aberration diagrams for the whole optical system according to Example 1.

FIGS. 2 and 3 are illustrative in the Y-Z and X-Z sections of the image display apparatus P comprising the prism optical system 1 of Example 1, respectively, and FIGS. 4 and 5 are sets of transverse aberration diagrams for the whole optical system.

The image display apparatus P of Example 1 comprises the prism optical system 1 and the image display device 2.

The prism optical system 1 is formed using two continuous optical surfaces, each having an optical action. The first surface 11 is located in opposition to the image display device 2, and capable of two transmissions and two internal reflections. The second surface 12 is located in opposition to the image display device 2 with the first surface 11 interposed between them, and capable of two internal reflections. Near the transmitting surface that is also the first surface 11 there is an exit pupil S provided.

In Example 1, both the first and the second surface are configured as free-form surfaces that are also rotationally asymmetric surfaces.

Upon back ray tracing, a light beam passing through the exit pupil S transmits through the third surface 11 (r3), entering the prism optical system 1. Then, it is internally reflected at the second surface 12 (r4), again internally reflected at the first surface 11 (r5), again internally reflected at the second surface 12 (r6), again internally reflected at the first surface 11 (r7), and once again internally reflected at the second surface 12 (r8), exiting out from the optical system 1 through the first surface 11 (r9). After exiting out from the prism optical system 1, the light beam enters the image display device 2.

In the image display apparatus P, the image display device 2 is located in opposition to the first surface 11 (r9) that is also the entrance surface through which light enters the prism optical system 1, and the viewer s eyeball 3 is located in opposition to the first surface 11 (r3) that functions as the transmitting area of the surface from which light exits out, so that enlarged virtual images can be presented to the viewer.

Figure 6:
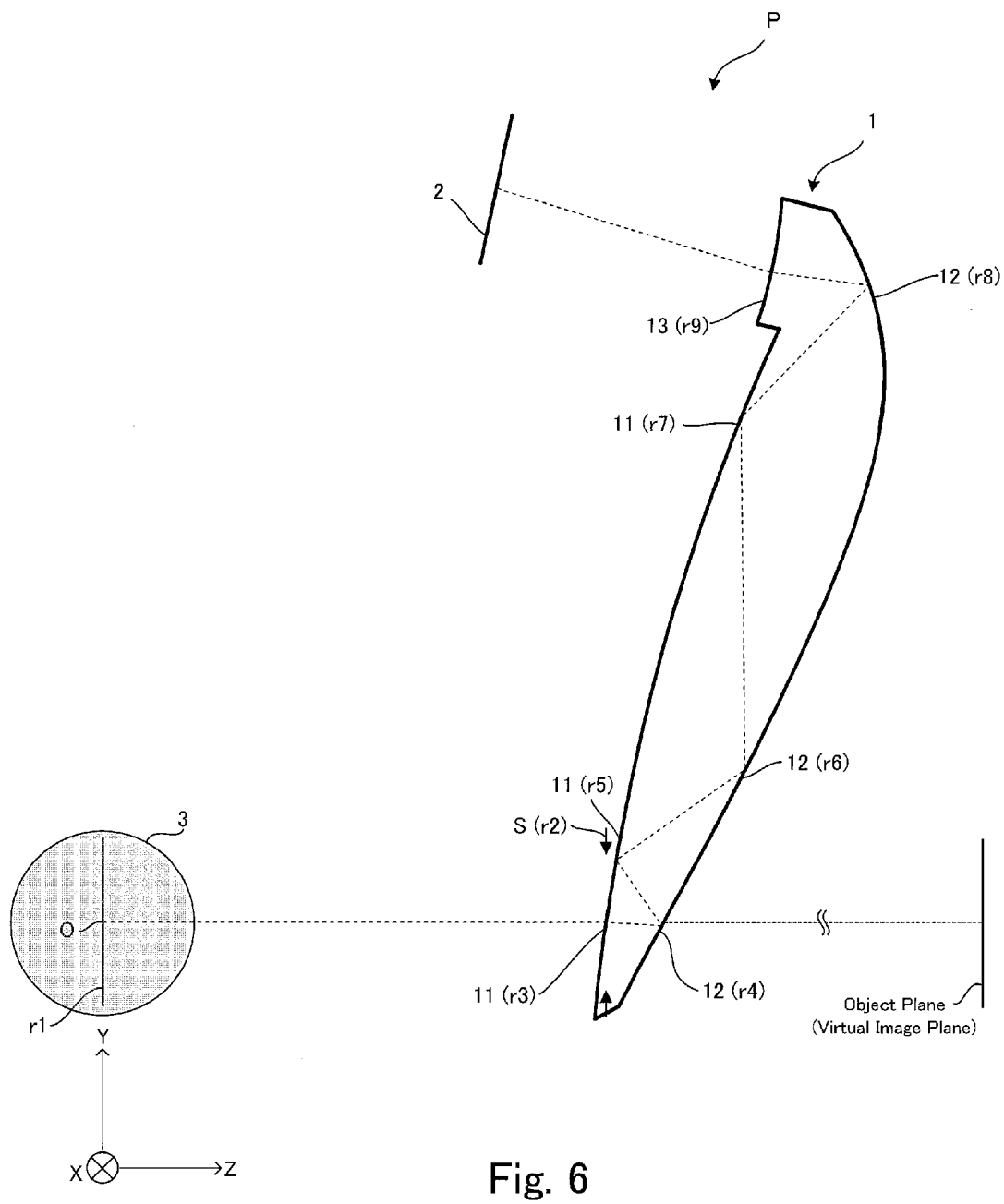
FIG. 6 is illustrative in construction of the prism optical system according to Example 2.
Figure 7:
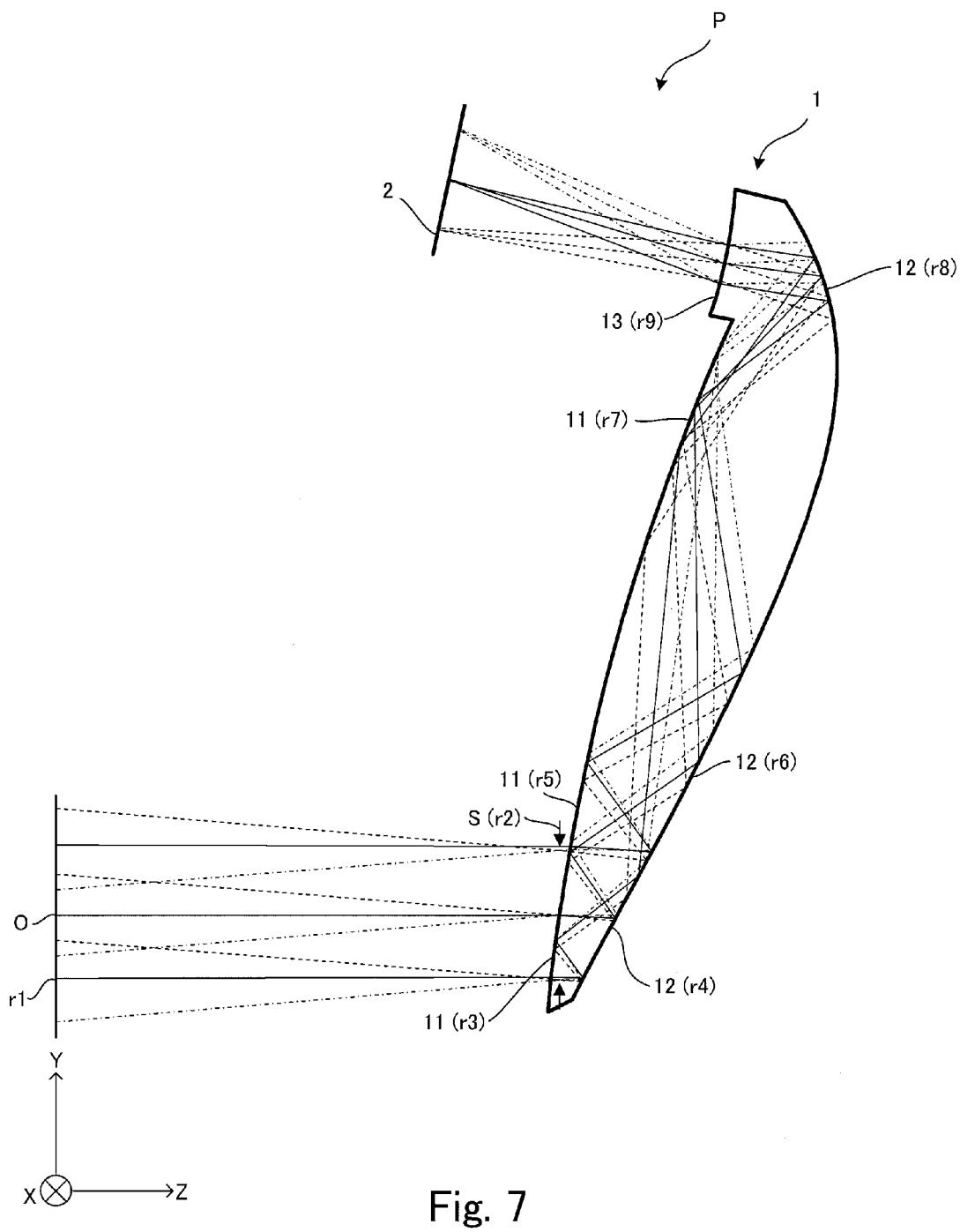
FIG. 7 is an optical path diagram in the Y-Z section for the prism optical system according to Example 2.
Figure 8:
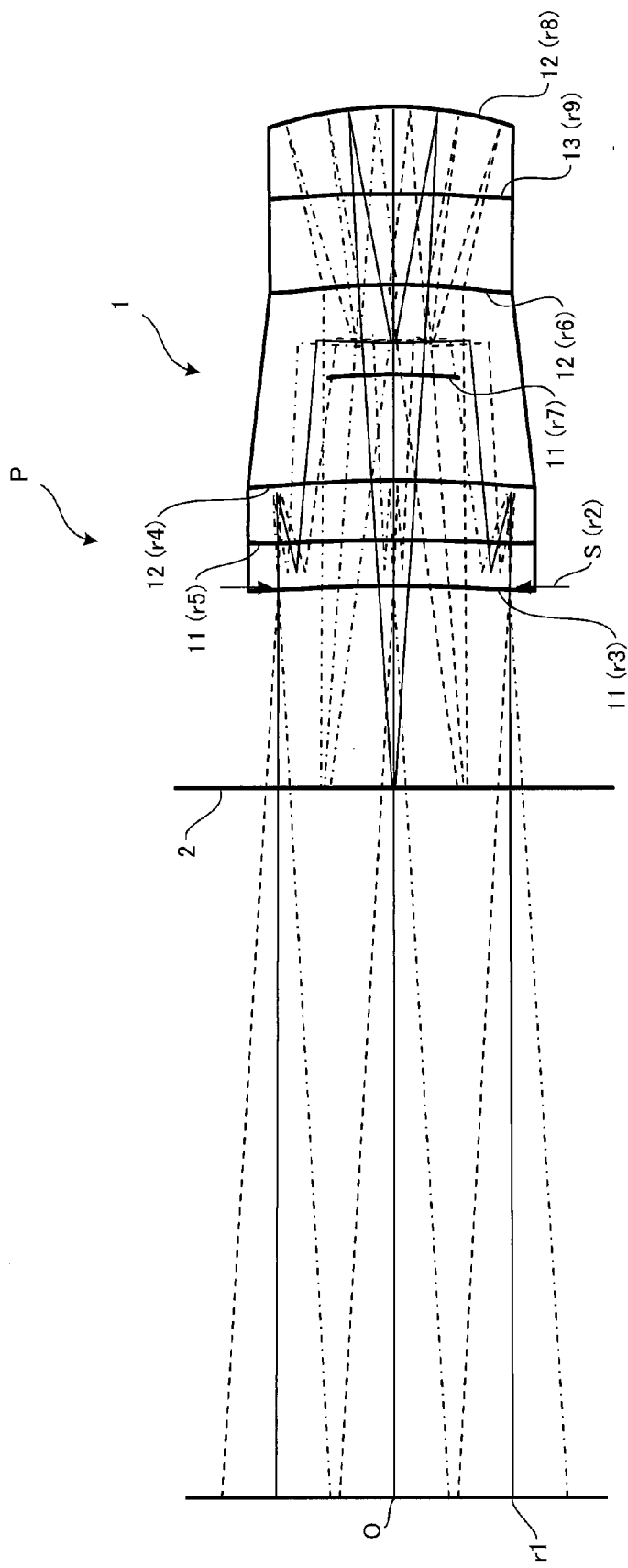
FIG. 8 is an optical path diagram in the X-Z section for the prism optical system according to Example 2.
Figure 9:
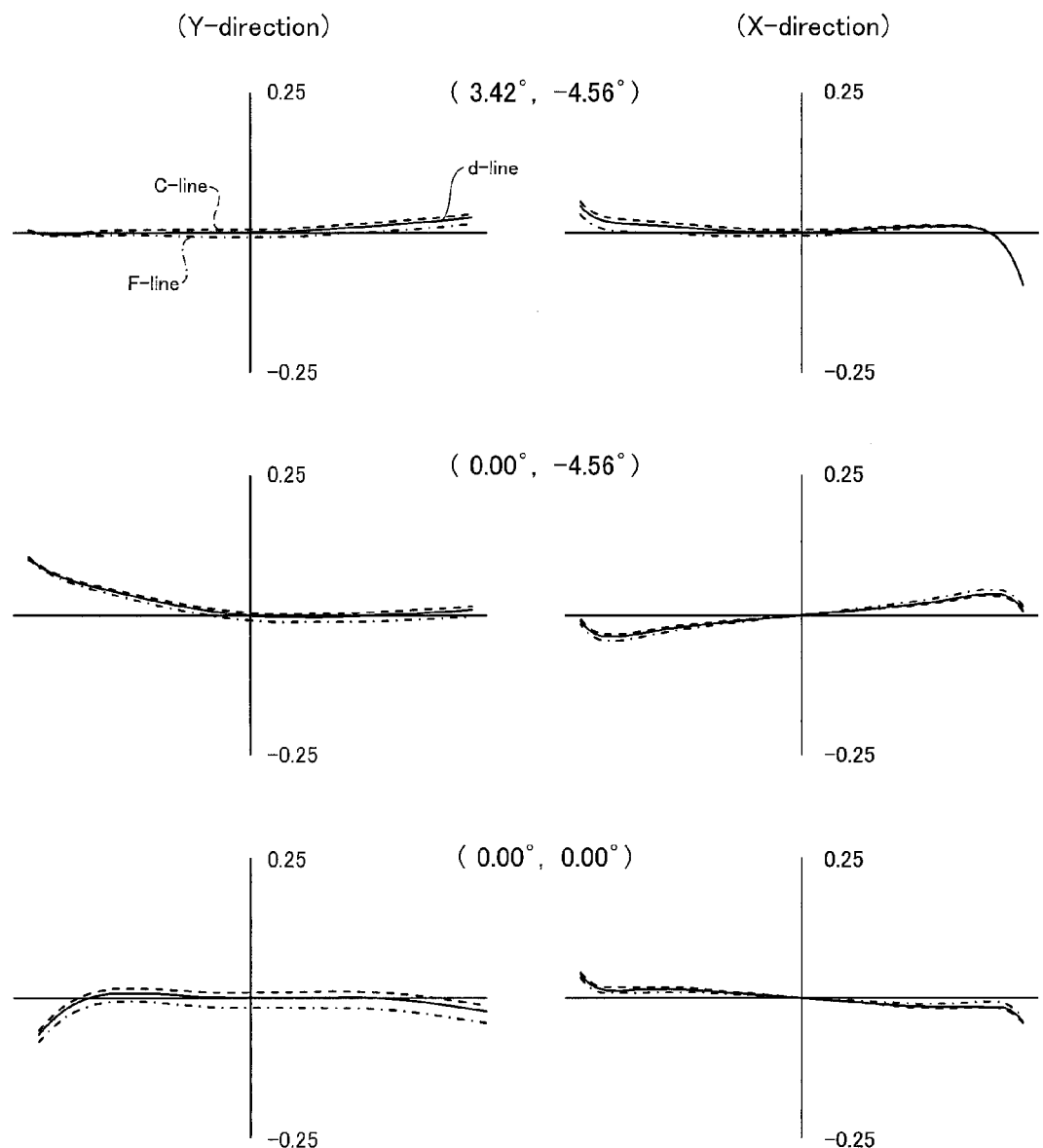
FIG. 9 is a set of transverse aberration diagrams for the whole optical system according to Example 2.
Figure 10:
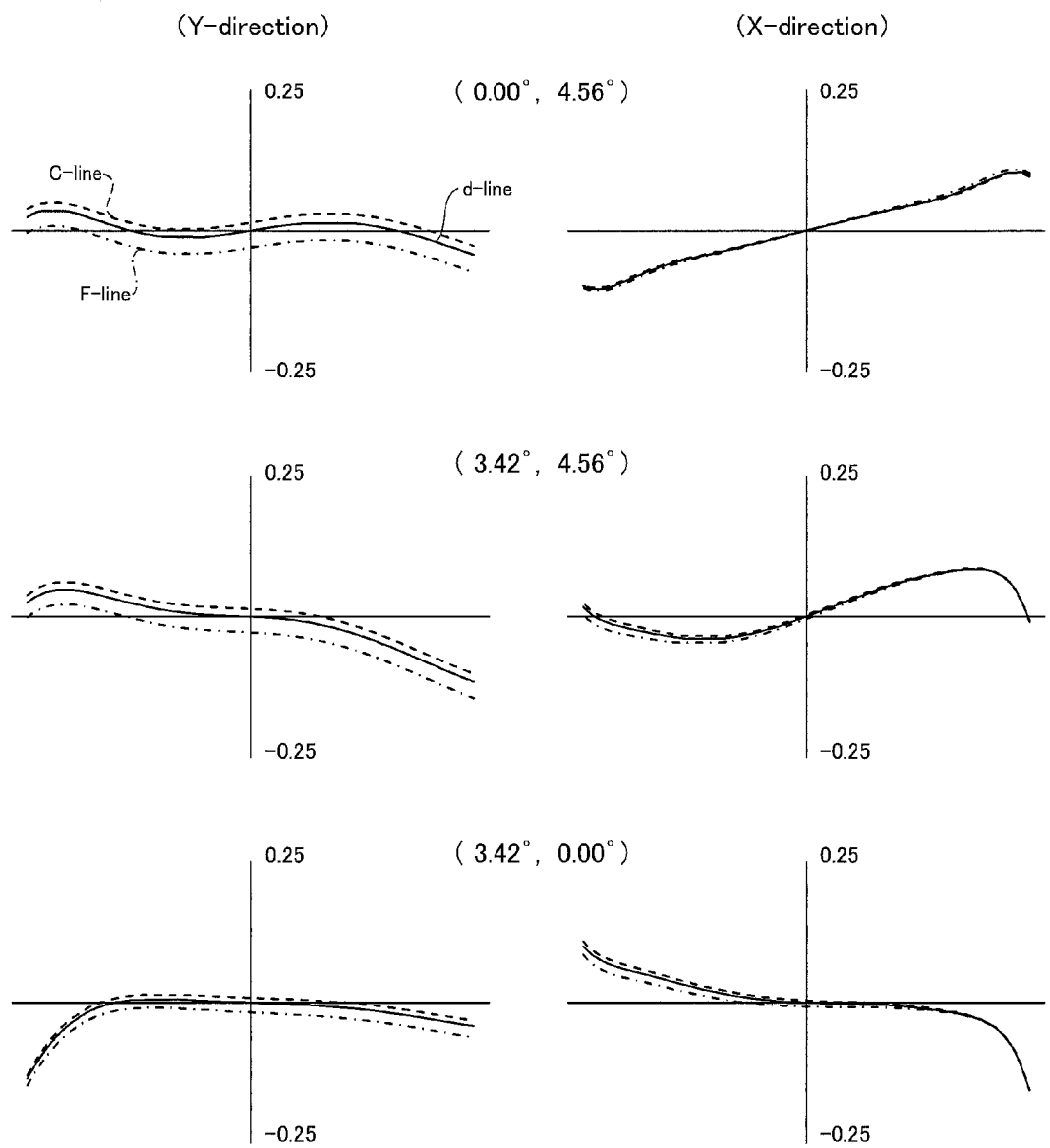
FIG. 10 is a set of transverse aberration diagrams for the whole optical system according to Example 2.

FIG. 6 is illustrative in construction of the image display apparatus P comprising the prism optical system 1 of Example 2, FIGS. 7 and 8 are illustrative in the Y-Z and X-Z sections of the image display apparatus P, respectively, and FIGS. 9 and 10 are sets of transverse aberration diagrams for the whole optical system.

The image display apparatus P of Example 2 comprises the prism optical system 1 and the image display device 2.

The prism optical system 1 is formed using three optical surfaces, each having an optical action. The first surface 11 is located in opposition to the image display device 2, and capable of one transmission and two internal reflections. The second surface 12 is located in opposition to the image display device 2 with the first surface 11 interposed between them, and capable of three internal reflections. The third surface 13 is located in opposition to the second surface 12 and on the side of the image display device 2, and capable of one transmission. Near the transmitting surface that is also the first surface 11 there is an exit pupil S provided.

In Example 2, the first 11, the second 12 and the third surface 13 are each configured as a rotationally asymmetric surface. The first surface 11 functions as a combined exit and internal reflection surface where two reflections occur, the second surface 12 functions as an internal reflection surface where three reflections occur, and the third surface 13 functions as an entrance surface.

Upon back ray tracing, a light beam passing through the exit pupil S transmits through the first surface 11 (r3), entering the prism optical system 1. Then, it is internally reflected at the second surface 12 (r4), again internally reflected at the first surface 11 (r5), again internally reflected at the second surface 12 (r6), again internally reflected at the first surface 11 (r7), and once again internally reflected at the second surface 12 (r8), exiting out from the optical system 1 through the third surface 13 (r9). After exiting out from the prism optical system 1, the light beam enters the image display device 2.

In the image display apparatus P, the image display device 2 is located in opposition to the third surface 13 that is also the entrance surface through which light enters the prism optical system 1, and the viewer s eyeball 3 is located in opposition to the first surface 11 that functions as the transmitting area of the surface from which light exits out, so that enlarged virtual images can be presented to the viewer.

Tabulated below are the constituting parameters of Examples 1 and 2. Note here that in the following table, FFS stands for the free-form surface.

Example 1

| Surface No. | Radius of Curvature | Surface Separation | Decentration | Refractive Index | Abbe Constant |
|---|---|---|---|---|---|
| Object Plane | ∞ | −1000.00 | | | |
| r1 | ∞ (Dummy Plane) | | | | |
| r2 | ∞ (Exit Pupil) | | | | |
| r3 | FFS[1] | | Decentration(2) | 1.5254 | 56.2 |
| r4 | FFS[2] | | Decentration(3) | 1.5254 | 56.2 |
| r5 | FFS[1] | | Decentration(2) | 1.5254 | 56.2 |
| r6 | FFS[2] | | Decentration(3) | 1.5254 | 56.2 |
| r7 | FFS[1] | | Decentration(2) | 1.5254 | 56.2 |
| r8 | FFS[2] | | Decentration(3) | 1.5254 | 56.2 |
| r9 | FFS[1] | | Decentration(2) | 1.5254 | 56.2 |
| Image Plane | ∞ | | Decentration(4) | | |

Angle of View: Horizontal 6.84° Vertical 9.12°

FFS[1]

| $C4$ | −4.097e−002 | $C6$ | 2.797e−003 | $C8$ | −1.021e−003 |
|---|---|---|---|---|---|
| $C10$ | 2.852e−005 | $C11$ | −6.159e−004 | $C13$ | −3.355e−005 |
| $C15$ | −4.324e−006 | $C17$ | 3.462e−006 | $C19$ | 2.193e−007 |
| $C21$ | −2.226e−007 | $C22$ | 3.358e−005 | $C24$ | 1.043e−006 |
| $C26$ | 2.298e−007 | $C28$ | 2.873e−009 | | |

FFS[2]

| $C4$ | −2.854e−002 | $C6$ | −1.554e−002 | $C8$ | −1.861e−003 |
|---|---|---|---|---|---|
| $C10$ | −9.123e−004 | $C11$ | −3.462e−004 | $C13$ | −1.594e−004 |
| $C15$ | −3.945e−005 | $C17$ | −8.232e−006 | $C19$ | −2.028e−006 |
| $C21$ | −7.821e−007 | $C22$ | 8.407e−006 | $C24$ | 1.641e−009 |
| $C26$ | 7.859e−008 | $C28$ | −3.656e−009 | | |

Decentration(1)

| X | 0.00 | Y | 0.00 | Z | 20.00 |
|---|---|---|---|---|---|
| α | 0.00 | β | 0.00 | γ | 0.00 |

Decentration(2)

| X | 0.00 | Y | 13.35 | Z | 23.84 |
|---|---|---|---|---|---|
| α | −17.83 | β | 0.00 | γ | 0.00 |

Decentration(3)

| X | 0.00 | Y | 19.19 | Z | 33.24 |
|---|---|---|---|---|---|
| α | −19.17 | β | 0.00 | γ | 0.00 |

Decentration(4)

| X | 0.00 | Y | 34.85 | Z | 19.26 |
|---|---|---|---|---|---|
| α | −12.57 | β | 0.00 | γ | 0.00 |

Example 2

Angle of View: Horizontal 6.84° Vertical 9.12°

| Surface No. | Radius of Curvature | Surface Separation | Decentration | Refractive Index | Abbe Constant |
|---|---|---|---|---|---|
| Object Plane | ∞ | −1000.00 | | | |
| r1 | ∞ (Dummy Plane) | | | | |
| r2 | ∞ (Exit Pupil) | | Decentration(1) | | |
| r3 | FFS[1] | | Decentration(2) | 1.5254 | 56.2 |
| r4 | FFS[2] | | Decentration(3) | 1.5254 | 56.2 |
| r5 | FFS[1] | | Decentration(2) | 1.5254 | 56.2 |
| r6 | FFS[2] | | Decentration(3) | 1.5254 | 56.2 |
| r7 | FFS[1] | | Decentration(2) | 1.5254 | 56.2 |
| r8 | FFS[2] | | Decentration(3) | 1.5254 | 56.2 |
| r9 | FFS[3] | | Decentration(4) | 1.5254 | 56.2 |
| Image Plane | ∞ | | Decentration(5) | | |

-continued

| Angle of View: Horizontal 6.84° Vertical 9.12° | | | | | |
|---|---|---|---|---|---|
| FFS[1] | | | | | |
| C4 | −1.217e−002 | C6 | 5.572e−003 | C8 | −1.257e−003 |
| C10 | −3.312e−005 | C11 | 1.245e−004 | C13 | −1.277e−004 |
| C15 | −6.142e−006 | C17 | 6.123e−005 | C19 | −2.452e−006 |
| C21 | 1.608e−007 | C22 | 3.857e−005 | C24 | 1.679e−006 |
| C26 | 6.144e−008 | C28 | 1.729e−008 | | |
| FFS[2] | | | | | |
| C4 | −2.035e−002 | C6 | −1.492e−002 | C8 | −1.879e−003 |
| C10 | −9.249e−004 | C11 | −2.082e−004 | C13 | −1.320e−004 |
| C15 | −3.946e−005 | C17 | −8.566e−006 | C19 | −2.398e−006 |
| C21 | −7.783e−007 | C22 | 1.605e−005 | C24 | −3.599e−007 |
| C26 | 8.955e−009 | C28 | −3.586e−009 | | |
| FFS[3] | | | | | |
| C4 | −2.463e−002 | C6 | −7.680e−003 | C8 | −1.859e−003 |
| C10 | −1.639e−003 | C11 | −3.787e−004 | C13 | −6.550e−004 |
| C15 | −9.815e−004 | C17 | 7.054e−006 | C19 | −1.161e−003 |
| C21 | 1.416e−004 | C22 | 1.524e−004 | C24 | −9.199e−005 |
| C26 | −1.939e−004 | C28 | 4.349e−005 | | |

| Decentration(1) | | | | | |
|---|---|---|---|---|---|
| 7X | 0.00 | Y | 0.00 | Z | 20.00 |
| α | 0.00 | β | 0.00 | γ | 0.00 |
| Decentration(2) | | | | | |
| X | 0.00 | Y | 13.83 | Z | 22.99 |
| α | −16.26 | β | 0.00 | γ | 0.00 |
| Decentration(3) | | | | | |
| X | 0.00 | Y | 19.46 | Z | 32.03 |
| α | −17.89 | β | 0.00 | γ | 0.00 |
| Decentration(4) | | | | | |
| X | 0.00 | Y | 31.27 | Z | 27.97 |
| α | −10.20 | β | 0.00 | γ | 0.00 |
| Decentration(5) | | | | | |
| X | 0.00 | Y | 34.18 | Z | 14.79 |
| α | −12.15 | β | 0.00 | γ | 0.00 |

As explained above, one aspect of the invention successfully provides a prism optical system comprising one single optical device which is very small and lightweight and has high configuration flexibility and by which an image on an image display device can be projected as a virtual image to the viewer s eyeball. Further, the invention successfully provides an eyeglasses type image display apparatus that is lightweight and inexpensive and has good design capability.

Figure 11:
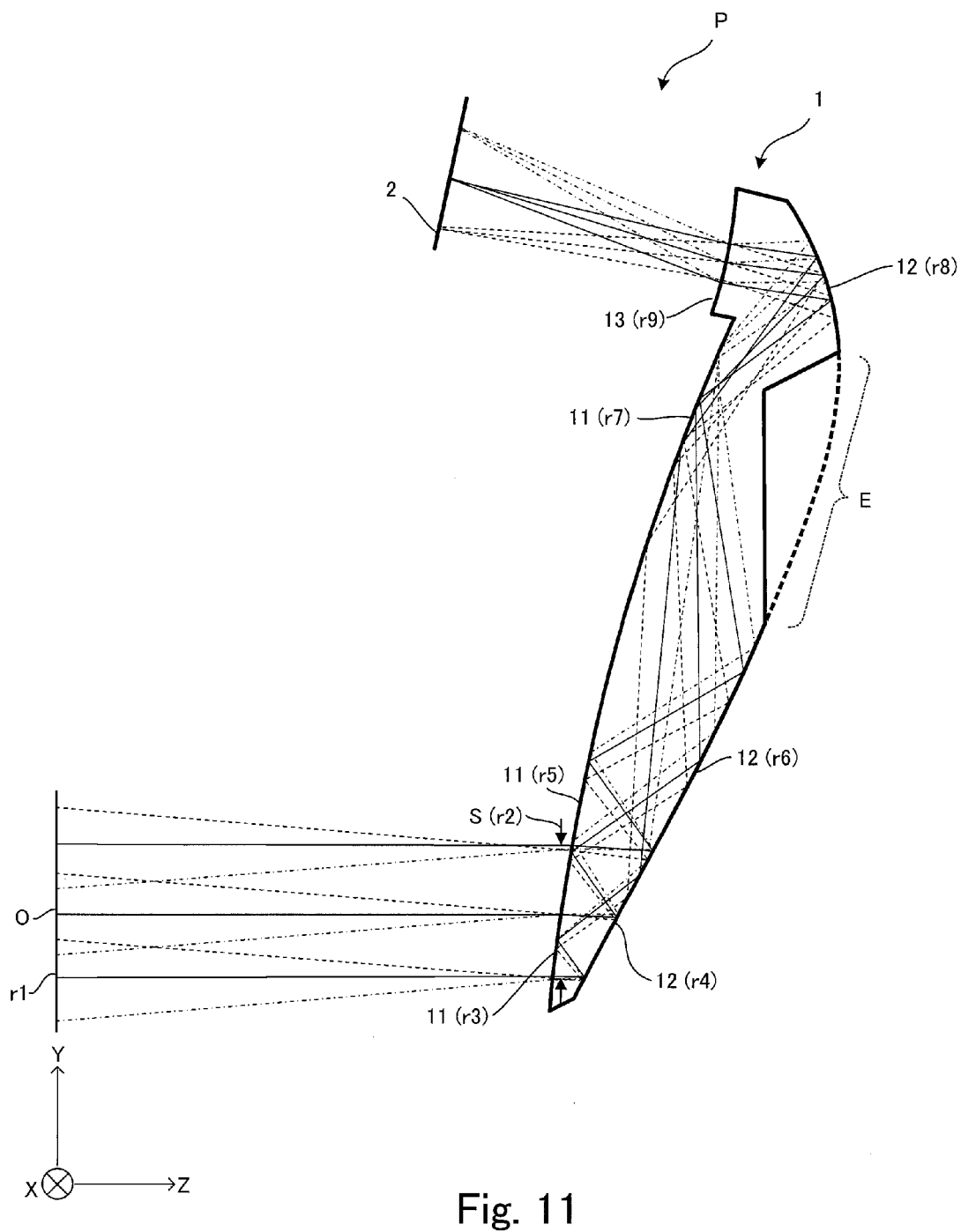
FIG. 11 is an optical path diagram in the Y-Z section for a prism optical system according to one modification to Example 2.

FIG. 11 illustrates schematically a modification to Example 2 in which, as shown, a portion E including the second surface 12 is cut away from the prism optical system 1. By cutting what does not contribute to the optical path involved away from the prism optical system 1, it is thus possible to achieve further weight reductions.

Further, if the prism optical system 1 is configured such that a given portion is cut away from it so as to locate a stop near the position where the intermediate image is to be formed inside the prism optical system 1, it is then possible to limit light away from the light ray path shown or the so-called stray light. With the prism optical system 1 of such configuration, it is possible to view or take clearer images because ghosts and flares are limited. Note here that the prism optical system 1 of such configuration may be fabricated by cutting the portion E away from the previously produced prism optical system 1 or by producing the prism optical system 1 from which the portion E has already been cut away.

Figure 12:
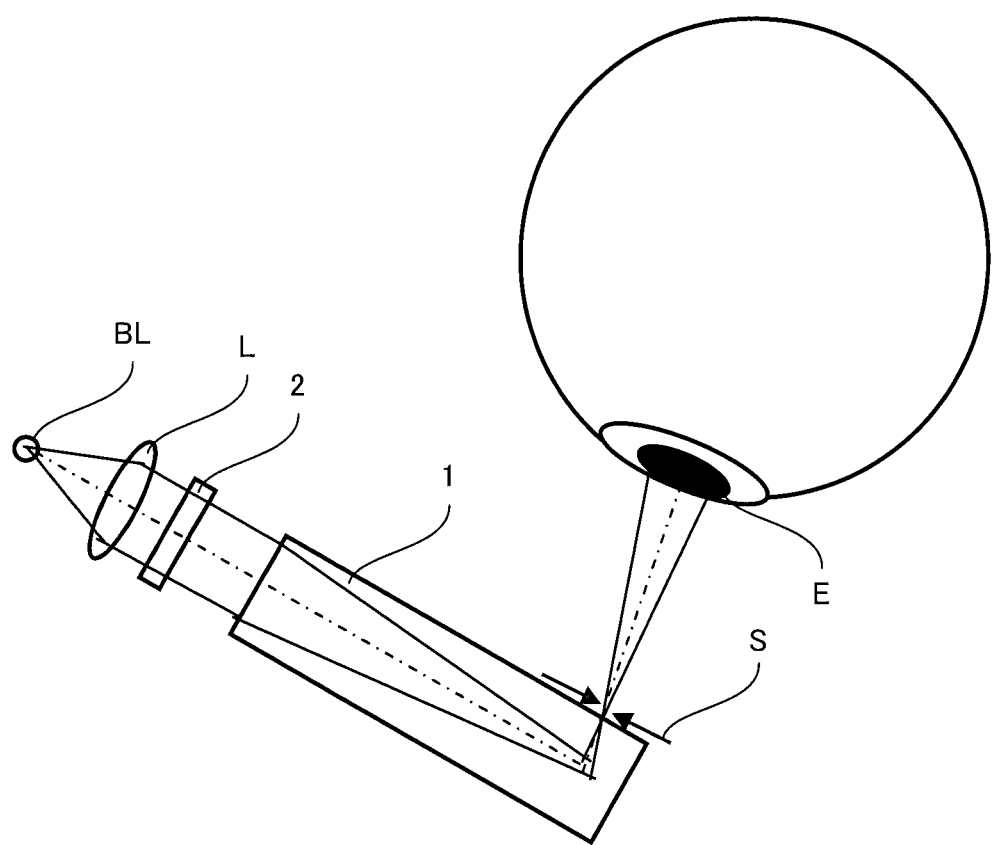
FIG. 12 is illustrative of the basic construction of the image display apparatus using the prism optical system.

FIG. 12 is illustrative in schematic of the basic arrangement of the image display apparatus P incorporating the prism optical system 1.

The object of the instant embodiment is to use the prism optical system 1 and the image display device 2 thereby providing the image display apparatus P that can be reduced in terms of size, weight and cost, and allows those who put on it to look objectively quite natural.

The image display apparatus P here uses a liquid crystal display device as the image display device 2. The use of the liquid crystal display device requires a back-light BL as a light source. In the embodiment here, a lighting lens L is interposed between the backlight BL and the image display device 2.

Such construction of the image display apparatus P here enables image-bearing light exiting out from the image display device 2 to be bent by the prism optical system 1 having positive power toward the eyeball, and makes it possible for the viewer to view an image as a virtual image.

The vicinity of the exit portion may be designed to function as a sort of aperture stop S so that an image can be viewed even when the prism optical system 1 per se is in a low-profile, elongated form.

When the image display device 2 is a liquid crystal display device, there is the need for using backlight BL and, in view of lighting efficiency, it is desired that an image at the light source is positioned near the exit window.

Preferably, the prism optical system 1 is positioned somewhat outside of the front direction of the eyeball; so there is no risk of the prism optical system 1 or an image projected by the prism optical system 1 being in the way to the front of the field of vision. Moreover, the optical path involved can be so curtailed that the prism optical system 1 can be made more compact.

Figure 13:
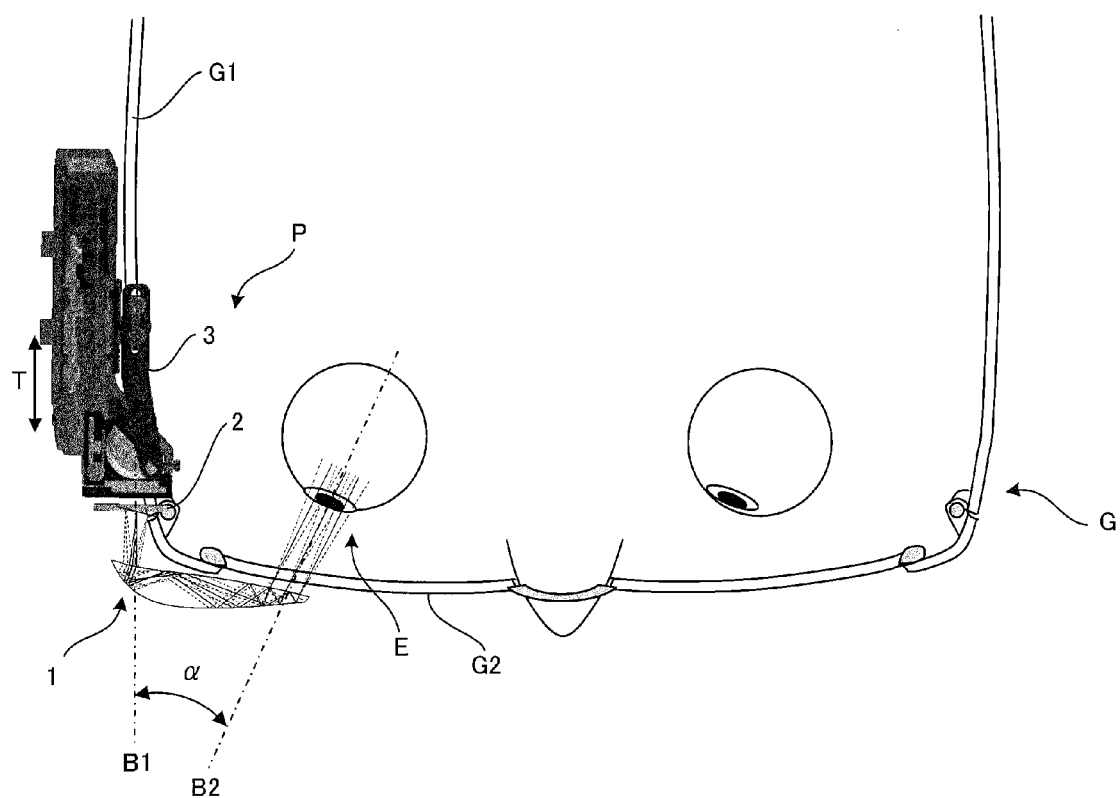
FIG. 13 is a top view of the image display apparatus using the prism optical system.

FIG. 13 is a top view of the image display apparatus P equipped with the prism optical system 1, which is attached to eyeglasses G. In the embodiment here, the image display apparatus P comprises as main components the prism optical system 1, the image display device 2 and an electric parts system 3. In the embodiment here, while the eyeglasses G are used for fixing the position of the image display apparatus P, it is to be understood that the position of the image display apparatus P may be fixed by suitable means such as a special-purpose means.

The electric parts system 3 supplies images to the image display device 2. This electric parts system 3 is built up of a power source part such as a battery, a storage part having image contents stored in it, a communication part for communication to other equipment, an interface part or the like. In the embodiment here, the electric parts system 3 is integral to the image display device 2, and clipped or otherwise fixed to the temple segment (sidepieces) G1 of eyeglasses G.

In the embodiment here, the prism optical system 1, the electric parts system 3 and the image display device 2 are combined into a single unit that is then clipped or otherwise fixed to the eyeglasses G in such a way as to be positioned on the underside of the temple segment G1. It is here to be understood that the prism optical system 1, the electric parts system 3 and the image display device 2 may be fixed to the eyeglasses G independently rather than combined into a single unit.

The location of the prism optical system 1 relative to the image display device 2 may be moved back and forth for diopter adjustment; so there may be images provided depending on the viewer s visual acuity. In the embodiment here, the location of the electric parts system 3 inclusive of the image display device 2 is moved back and forth, as indicated by a double action arrow T, so that the distance between it and the prism optical system 1 can be varied for diopter adjustment.

In the image display apparatus P attached to such eyeglasses G, image-bearing light exiting out from the image display device 2 turning in the front direction is directed toward the pupil via the prism optical system 1. The prism optical system 1 has positive power enough to enlarge an image from the image display device 2 so that the wearer can view it as a virtual image. Desirously in this case, the angle α that the first axial chief ray B1 exiting out from the center of the image display device 2 forms with the second axial chief ray B2 exiting out from the prism optical system 1 and arriving at the center of the viewer s pupil is 0° to 60°.

FIG. 13 is a side view of how to put on the image display apparatus P shown in FIG. 12. In the embodiment here, the image display apparatus P in a single unit form is clipped or otherwise attached to the underside of the temple segment G1. The axial chief ray exiting out horizontally from the image display device 2 turning in the front direction of the viewer is directed obliquely upward by the prism optical system 1, entering the viewer s eyeball.

With the prism optical system 1 of the embodiment here, it is possible to turn the horizontally directed image-bearing light obliquely downward, or at a given angle in the X-Z plane as explained with reference to FIG. 3, into the viewer s eyeball and, hence, to locate the prism optical system 1 below the front of the field of vision. Thus, the prism optical system 1 or an image projected by it is not in the way to the field of vision.

Figure 14:
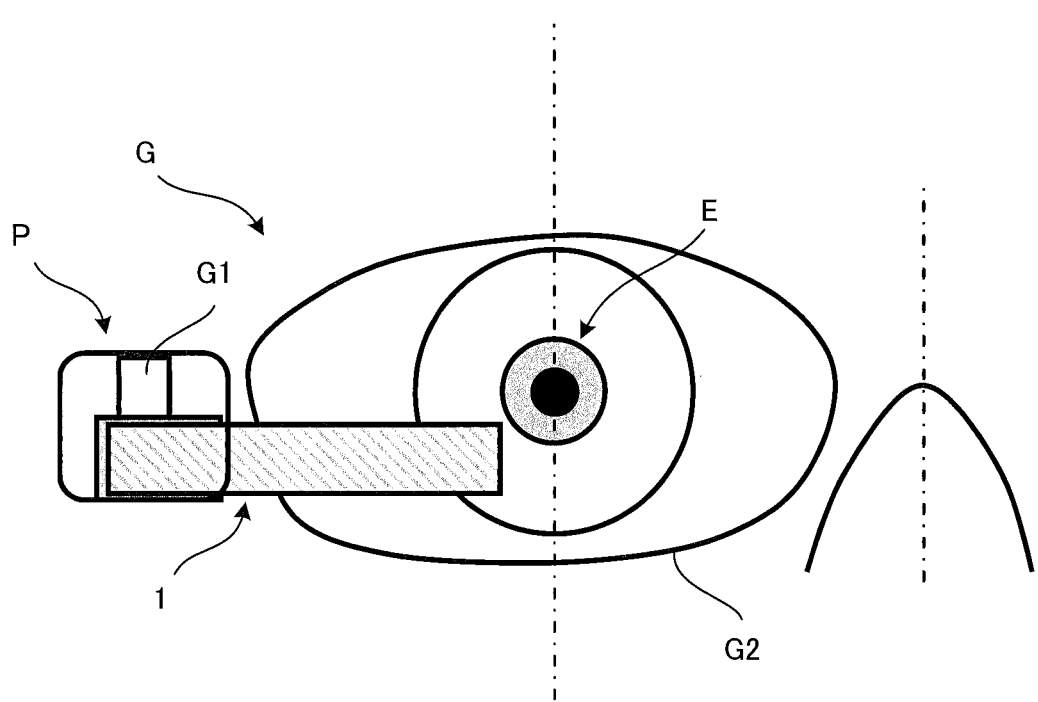
FIG. 14 is a front view of the image display apparatus using the prism optical system.
Figure 15:
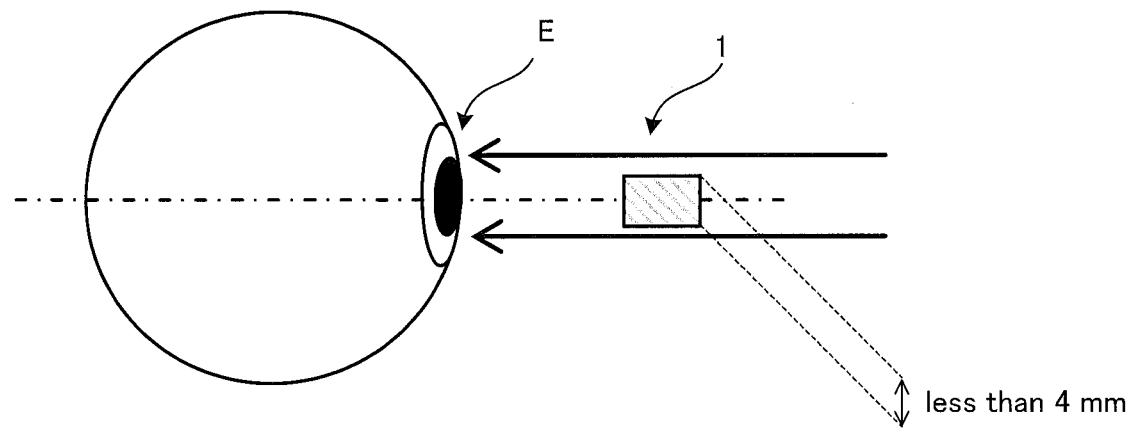
FIG. 15 is a side view of the image display apparatus using the prism optical system.
Figure 16:
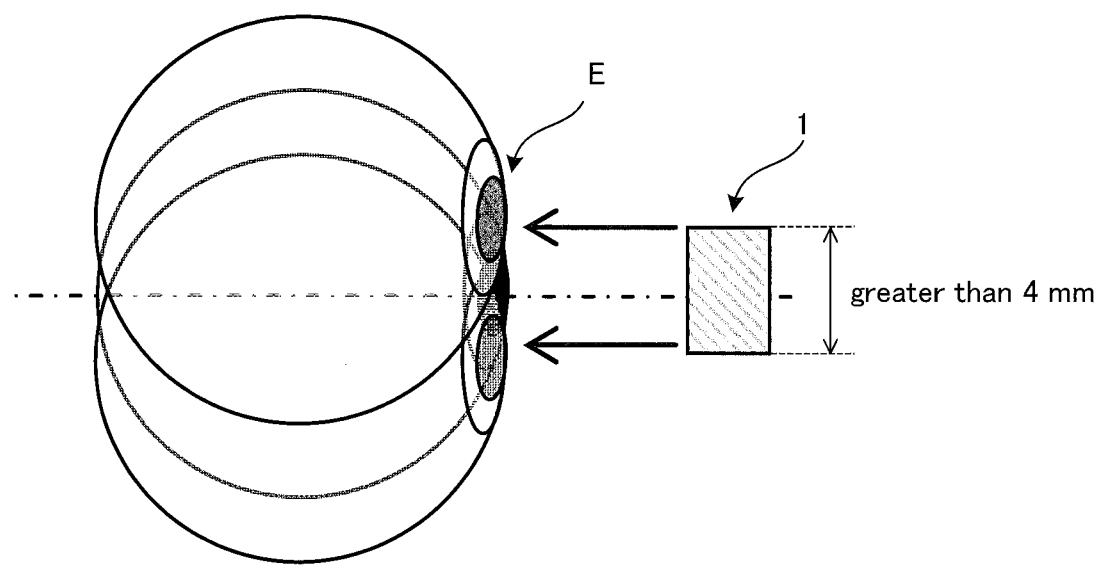
FIG. 16 is a side view of the image display apparatus using the prism optical system.

FIG. 14 is a side view of the image display apparatus P incorporating the prism optical system, and FIGS. 15 and 16 are side views of the image display apparatus P incorporating the prism optical system. As depicted in FIG. 14, the prism optical system 1 is located in opposition to the viewer s pupil E as viewed from front so that enlarged virtual images can be presented to the viewer.

As the vertical width of the portion of the prism optical system 1 opposing to the viewer s pupil E is set at less than 4 mm that is a human being s average pupil diameter as shown in FIG. 15, it brings about the see-through feature: scenes behind the prism optical system 1 are visible to the viewer s pupil E from above and below the prism optical system 1.

As the vertical width of the portion of the prism optical system 1 opposing to the viewer s pupil E is set at greater than 4 mm as shown in FIG. 16, there is a longitudinal width long enough to provide a wide tolerance to vertical shifts.

According to the embodiment here, there is an eyeglasses type image display apparatus P provided that enables the see-through feature: the outside world and electronic images can be simultaneously viewed without intercepting the outside-world field of vision, and can be reduced in terms of size, weight and cost.

If, instead of the image display device 2, an imaging device (not shown) is used with the prism optical system 1 of the embodiment here, it is then possible to provide an imaging apparatus that can be reduced in terms of size, weight and cost.

Figure 17:
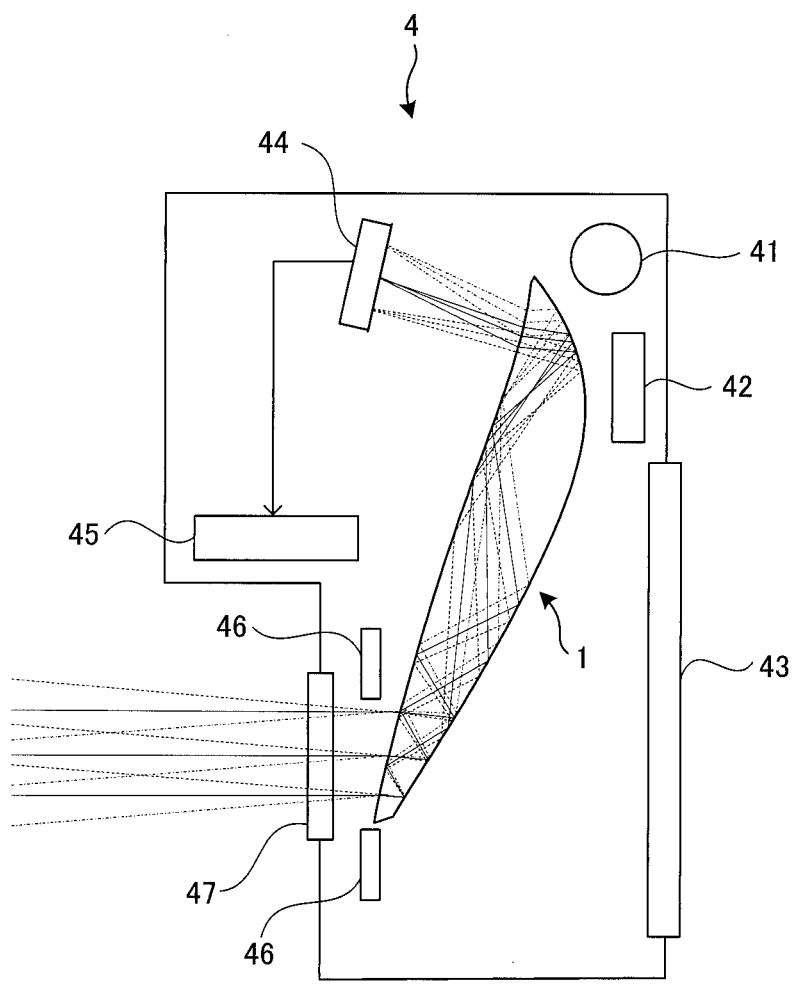
FIG. 17 is illustrative of the basic construction of the imaging apparatus using the prism optical system.

FIG. 17 is illustrative of the basic makeup of an imaging apparatus, viz., a digital camera to which the prism optical system according to the embodiment here is applied. When the inventive prism optical system is applied to the imaging apparatus, the exit pupil of the image display apparatus functions as an entrance pupil, and an aperture stop 46 is located near the pupil position. The aperture of the aperture stop 46 is opened wide or narrow for brightness adjustment. Instead of the display device here, there is a CCD or other imaging device 44 located.

The digital camera body is provided with an entrance window 47 that does just only take light inside but also prevents contamination of the interior, a switch 42, shutter 41, and a rear display panel 43 for checking on operation and the taking of images. As the switch 42 is held on and the shutter 41 is pressed down, it causes a shutter (not shown) affixed to the imaging device 44 to be actuated. Then, still images are taken by the imaging device 44 for a time preset at a shutter speed, and image data are loaded up in an image recording memory 45. For the taking of moving images, moving images taken in the imaging device 44 with the shutter held open are loaded up in the image recording memory 45.

While the present invention has been explained with reference to various embodiments, it is to be understood that the present invention is by no means limited to them, and other embodiments comprising combinations of the requirements and limitations for the invention may fall within the category of the invention too.

What is claimed is:

1. A prism optical system comprising:
   a prism in which a space formed by at least two optical surfaces mutually decentered with respect to an axial chief ray of an incident light beam is filled up with a medium having a refractive index of greater than 1, wherein:
   at least two surfaces out of said optical surfaces are rotationally asymmetric surfaces, five internal reflections take place inside said prism, and there is an intermediate image formed inside said prism, which image is in turn formed outside said prism, and one surface out of a surface on which light is incident and a surface from which light exits is capable of at least one transmission and at least two internal reflections, and a transmitting area having said transmission and a reflecting area having said internal reflections at least partly overlap.

2. The prism optical system as recited in claim 1, wherein at least one internal reflection off at least one surface of said entrance or exit surface is total reflection.

3. The prism optical system as recited in claim 1, wherein a surface in opposition to said entrance or exit surface is defined by a single surface.

4. The prism optical system as recited in claim 1, wherein light exiting out from an image display surface for displaying an image enters said prism optical system, and thereafter exits out from said prism optical system, forming an exit pupil to be projected onto the eyeball of an viewer, and such that in order along an optical path taken by light from incidence of said light on said prism optical system until said light exits out from said prism optical system, said light enters a first surface that is an entrance or transmitting surface, and is reflected at a second surface that is an internal reflection surface in opposition to said first surface, then again reflected at said first surface that is an internal reflection surface, then again reflected at said second surface that is an internal reflection surface, then again reflected at said first surface that is an internal reflection surface, and then again reflected at said second surface that is an internal reflection surface, exiting out from said prism optical system through said first surface.

5. The prism optical system as recited in claim 1, wherein an angle $\alpha$ that an axial chief ray incident on said prism optical system forms with an axial chief ray exiting out from said prism optical system satisfies a condition: $0° \leq \alpha \leq 60°$.

6. The prism optical system as recited in claim 1, wherein the entrance surface and the exit surface are the same surface.

7. The prism optical system as recited in claim 1, wherein the entrance surface is different from the exit surface.

8. The prism optical system as recited in claim 1, wherein a surface in opposition to the surface on which light is incident or the surface from which light exits out is partially cut away.

9. An image display apparatus including the prism optical system as recited in claim 1, wherein when said image display device is located in opposition to said first surface of said prism optical system and the eyeball of a viewer is located in opposition to a transmitting area of said first surface, an enlarged virtual image is presented to said viewer.

10. The imaging display apparatus as recited in claim 9, wherein an exit pupil of said prism optical system is formed near an exit window of the first surface or between the first surface and the eyeball of the viewer.

11. An imaging apparatus including the prism optical system as recited in claim 1, wherein an imaging device is positioned in opposition to said first surface, and an aperture stop is positioned in front of and near a transmitting area of said first surface to take images in the outside world.

* * * * *